(12) United States Patent
Kikuchi (10) Patent No.: US 6,484,502 B1
(45) Date of Patent: Nov. 26, 2002

(54) POWER GENERATION SYSTEM (75) Inventor: Masaichi Kikuchi, Taira-machi (JP)

(73) Assignees: Shigeto Nakashima, Miyazaki (JP); Yukiko Morikawi, Sorachigun (JP)

( * ) Notice: Subject to any disclaimer, the term of this patent is extended or adjusted under 35 U.S.C. 154(b) by 0 days.

(21) Appl. No.: 09/830,070
(22) PCT Filed: Aug. 23, 1999
(86) PCT No.: PCT/JP99/04531
§ 371 (c)(1), (2), (4) Date: Jul. 23, 2001
(87) PCT Pub. No.: WO01/14703
PCT Pub. Date: Mar. 1, 2001

(51) Int. Cl.⁷ .............................................. F01K 17/00
(52) U.S. Cl. .......................................... 60/648; 60/649
(58) Field of Search ........................... 60/643, 648, 649

(56) References Cited

U.S. PATENT DOCUMENTS

| | | | |
|---|---|---|---|
| 4,026,223 A | * | 5/1977 | Robbins ..................... 110/7 R |
| 5,350,160 A | * | 9/1994 | Crafton et al. .............. 266/252 |

FOREIGN PATENT DOCUMENTS

| | | |
|---|---|---|
| JP | 54-44343 | 3/1979 |
| JP | 58-222984 | 12/1983 |
| JP | 61-85588 | 5/1986 |
| JP | 6-74448 | 3/1994 |
| JP | 9-263778 | 10/1997 |
| JP | 9-269110 | 10/1997 |

* cited by examiner

*Primary Examiner*—Hoang Nguyen
(74) *Attorney, Agent, or Firm*—Oblon, Spivak, McClelland, Maier & Neustadt, P.C.

(57) ABSTRACT

A power generating system comprising a heating furnace having an ion burner and positioned on the way of a vertical cylindrical path having a lower gas inlet port and an upper gas outlet port, an axial fan disposed in said path, and a power generator disposed out of said path and interlocking with said axial fan, and wherein a temperature and ion concentration inside said heating furnace are increased by said ion burner, with the result that gas flowed in from said gas inlet port flows through said path upward as a vortical ascending current, and said axial fan is rotated by the vortical ascending current, and said power generator is driven by a rotation of said fan for power generation.

18 Claims, 7 Drawing Sheets

POWER GENERATION SYSTEM

BACKGROUND OF THE INVENTION

1. Field of the Invention

The present invention relates to a power generating system in which power is generated by energy of a continuous vortical ascending current created artificially.

2. Description of the Related Art

As power generating systems, there are a thermal power generating system, a nuclear power generating system, a hydraulic power generating system and the like. Although these systems are common in the point that power is generated by rotating a turbine of a power generator, energy sources for rotating the turbine are different. In the thermal power generating systems, steam is generated by burning heavy oil or other fuel and the turbine is rotated by energy of the steam. In the nuclear power generating systems, although the turbine is similarly rotated by energy of steam, the steam is generated by heat created by nuclear fission. In the hydraulic power generating systems, the turbine is rotated by energy of water falling from an elevated position. Other than the above systems, there are a wind power generating system in which a power of wind is utilized, a power generating system in which an electric power is generated by chemical reaction between hydrogen and oxygen, and the like.

SUMMARY OF THE INVENTION

The present invention is a system in which power is generated by energy different from the energy used in the conventional power generating systems and, in particular, rotating vanes are rotated by a continuous vortical ascending current created artificially (artificial tornado) and a power generator is driven by the obtained rotational force for power generation.

Natural tornado is generated as follows. When air (ionized) specific gravity of which is reduced by solar heat or other heat is ascended to create an ascending current, since atmospheric pressure therein is decreased to generate a low pressure, air is flowing into the ascending current to cancel the pressure difference. In this case, since cold air tends to flow into warm air, the surrounding air colder than the ascending air heated by the solar heat or other heat is flowing into the ascending current, thereby generating vortical current. Once the vortical current is generated, since additional air is flowing into the vortical current in a vortex manner, the rotational force is gradually increased to generate the tornado ultimately.

Further, if a difference in temperature between the ascending current and the surrounding air flowing into the ascending current is small, since the vortical current is generated at a relatively low height, the vortical current is grown, with the result that the low pressure is created in the center of the vortical current, thereby generating a typhoon.

The power generating system according to the present invention, the artificial tornado is created by utilizing the principle of the generation of the natural tornado or the typhoon and the power is generated by energy of the artificial tornado. More specifically, the present invention is constituted as follows.

According to an aspect of the present invention, there is provided a power generating system comprising a heating furnace having an ion burner and positioned on the way of a vertical cylindrical path having a lower gas inlet port and an upper gas outlet port, an axial fan disposed in the path, and a power generator disposed out of the path and interlocking with the axial fan, and wherein temperature and ion concentration inside the heating furnace are increased by the ion burner, with the result that gas flowed in from the gas inlet port is flows through the path upward as a vortical ascending current, and the axial fan is rotated by the vortical ascending current, and the power generator is driven by a rotation of the fan for power generation.

According to another aspect of the present invention, in the above-mentioned power generating system, the heating furnace is further provided with a discharge electrode for maintaining the temperature inside the heating furnace and a particle accelerator for maintaining or increasing ion concentration, and, when the temperature and the ion concentration inside the heating furnace reach predetermined levels, the ion burner is temporarily stopped, and, thereafter, one or both of the discharge electrode and the particle accelerator is driven to maintain the temperature or the ion concentration inside the heating furnace, and, if the temperature or the ion concentration is decreased below the predetermined level, the ion burner is driven again to increase the temperature and the ion concentration inside the heating furnace up to the predetermined levels, and, by repeating the temporary stop of the ion burner, the driving of one or both of the discharge electrode and the particle accelerator and the re-driving of the ion burner, the temperature and the ion concentration inside the heating furnace are maintained to values suitable for generating the vortical ascending current.

According to further aspect of the present invention, in the above-mentioned power generating systems, two or more axial fans are provided in the path and two or more power generators associated with the fans are also provided.

According to further aspect of the present invention, in the above-mentioned power generating systems, the axial fan is designed so that movable vanes thereof are rotated within stationary vanes thereof.

According to further aspect of the present invention, in the above-mentioned power generating systems, there is further provided an auxiliary ion burner disposed at an upper part of the path and adapted to re-heat the gas ascending through the path thereby to promote flow-out of the gas through the gas outlet port.

BEST MODE FOR CARRYING OUT THE INVENTION (First Embodiment)

Figure 1:
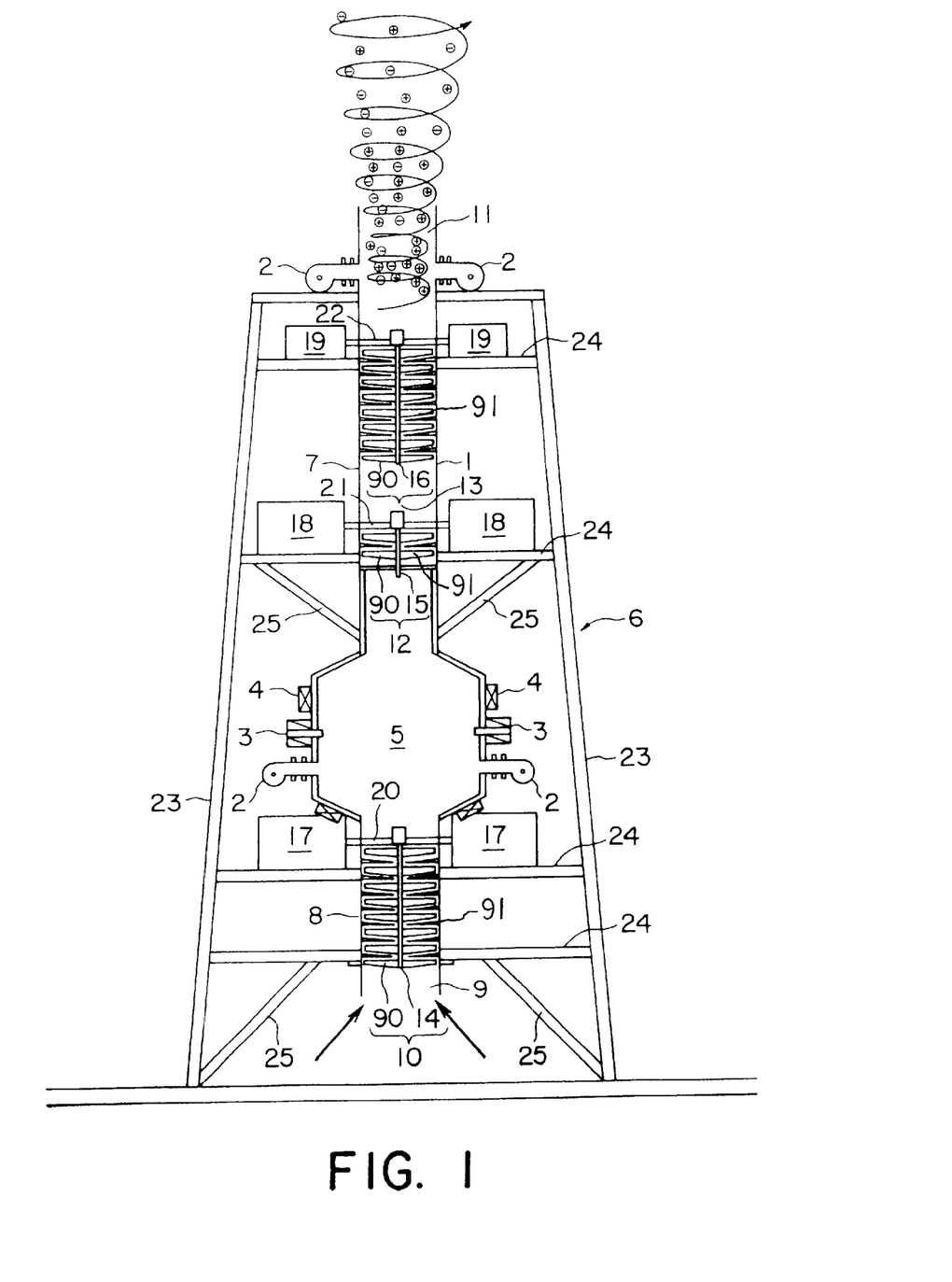
FIG. 1 is a schematic view showing a power generating system according to a first embodiment of the present invention.

As shown in FIG. 1, in a power generating system according to the present invention, a heating furnace 5 having ion burners 2, discharge electrodes 3 and particle accelerators 4 is mounted on an intermediate portion of a cylinder 1 having an inner diameter of about 3 m and a height of about 300 m, and the cylinder 1 and the heating furnace 5 are vertically supported by a frame 6. In this case, an upper part of an upper cylinder portion 7 of the cylinder 1 higher than the heating furnace 5 is protruded upwardly from the frame 6.

A gas inlet port 9 is formed in a lower end of a lower cylindrical portion 8 of the cylinder 1 lower than the heating furnace 5 and an axial fan 10 is disposed inside the lower cylindrical portion 8. A gas outlet port 11 is formed in an upper end of the upper cylinder portion 7 of the cylinder I higher than the heating furnace 5 and two axial fans 12, 13 are disposed inside the upper cylinder portion 7, and the ion burners 2 are mounted on an upper part of the upper cylinder portion 7. Rotary shafts 20, 21, 22 of power generators 17, 18, 19 of high voltage type are connected to rotary shafts 14, 15, 16 of the three axial fans 10, 12, 13, respectively.

The frame 6 is constituted in such a manner that four struts 23 each obtained by interconnecting desired number of prismatic metal pipes each having dimension of 300 mm×300 mm and a thickness of 10 mm are stood upright on a concrete foundation in a frusto-pyramid fashion and the four struts 23 are connected by metallic connecting members 24 at five points of each strut in the vertical direction and metallic reinforcing members 25 are connected obliquely between lower ends of the struts 23 and the lowest metallic connecting members 24 and additional metallic reinforcing members 25 are connected obliquely between the heating furnace 5 and the third (from bottom) metallic connecting members 24. The height of the frame 6 is selected to about 320 m in consideration of the height of the cylinder 1. The cylinder 1 can have an inner diameter of 3 m or more and height of 300 m or more, and, in such a case, the height of the frame 6 is increased accordingly.

In the power generating system according to the present invention, an artificial vortical ascending current is created in the interior (path) of the cylinder 1 by increasing the temperature and ion concentration inside the heating furnace 5 by partially or totally operating the ion burners 2, discharge electrodes 3 and particle accelerators 4 of FIG. 1, and the vortical ascending current is struck against the axial fan 10 below the heating furnace 5 and the axial fans 12, 13 above the heating furnace 5 thereby to rotate these axial fans 10, 12, 13 , and the power generators 17, 18, 19 connected to the respective axial fans 10, 12, 13 are driven by the rotation of the fan for the power generation.

Castable refractories (for example, mixture of refractory aggregate and alumina cement or hydraulic setting agent such as phosphoric acid) is used on a peripheral wall of the heating furnace 5 shown in FIG. 1, and three ion burners 2 having calorific value of about $100 \times 10^4$ KC are arranged on the peripheral wall equidistantly along a circumferential direction (only two of which are shown in FIG. 1). Distal ends of three ion burners 2 are directed toward the center of the heating furnace 5, so that high burning sounds due to explosive burning (burning of 13 to 15 m/s) generated from the respective ion burners 2 are impinged against each other to reduce the total noise by cancellation of sound waves and Doppler effect caused by impingement of sound waves.

Figure 2:
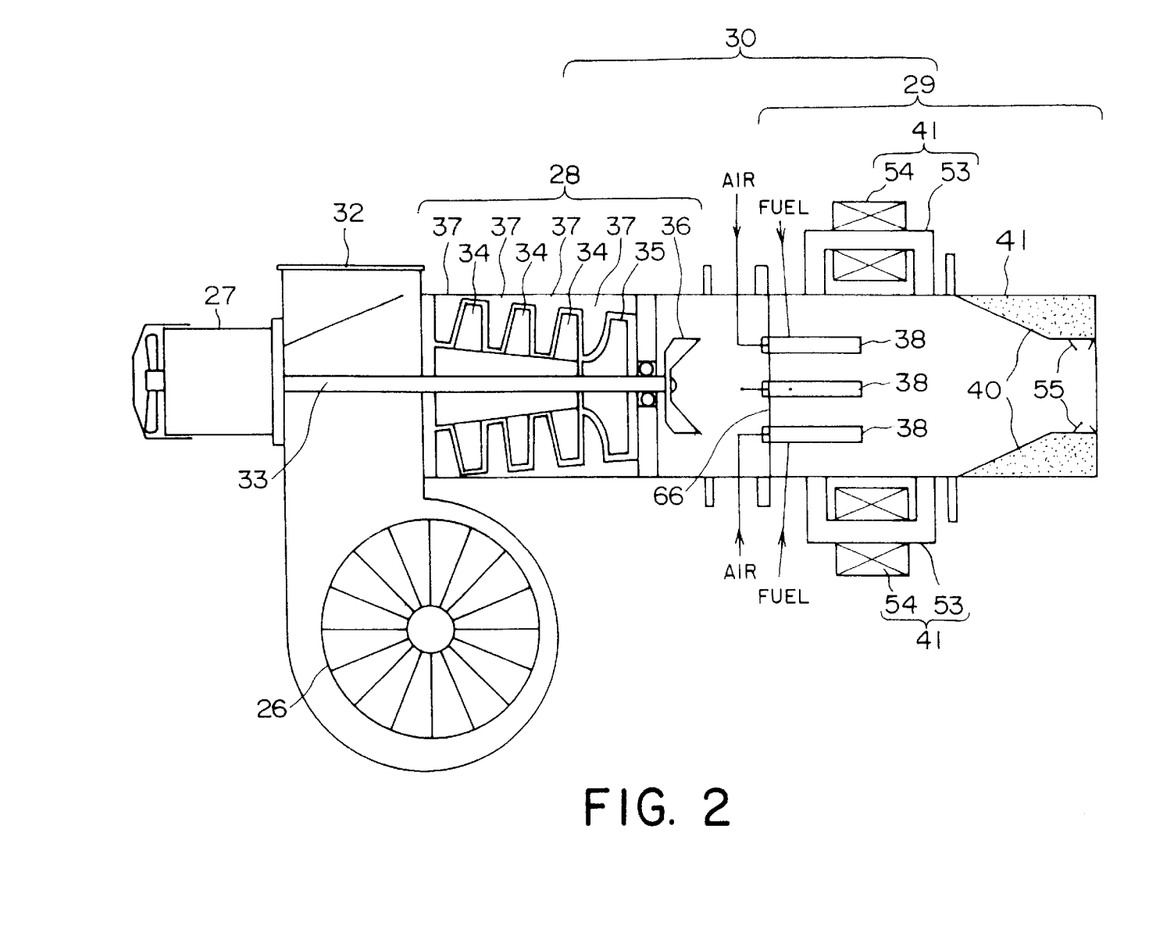
FIG. 2 is an explanatory view showing an ion flame generator of an ion burner used in the power generating system of FIG. 1.
Figure 3:
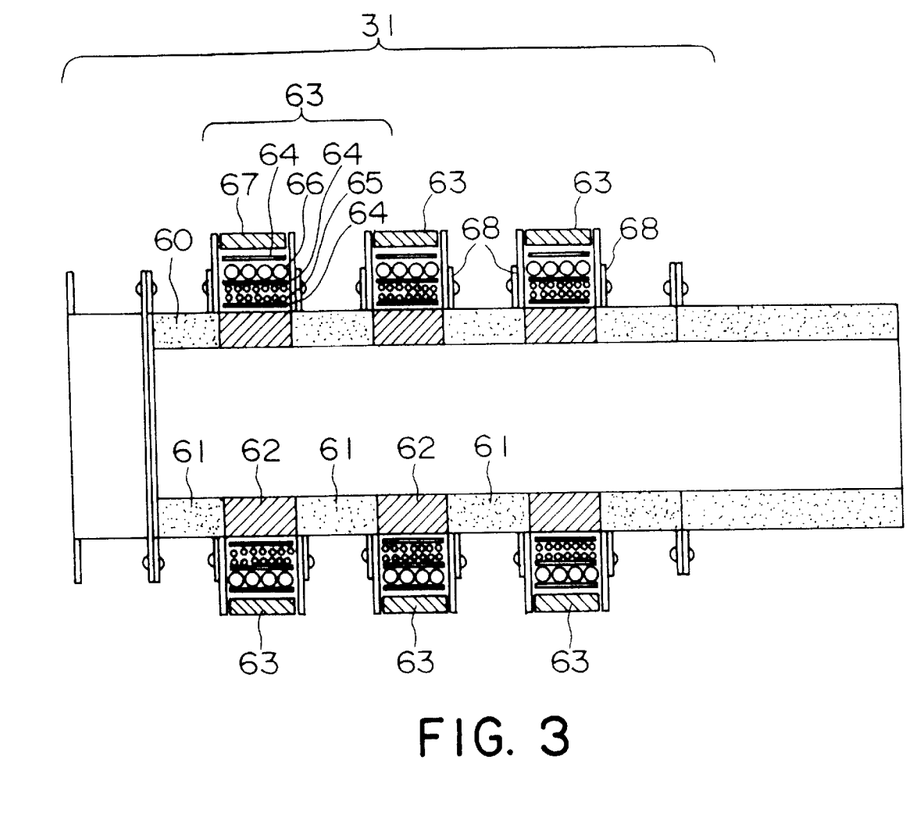
FIG. 3 is an explanatory view showing an ion breeder of the ion burner.

As shown in FIG. 2, each ion burner 2 is constituted by adding an ion breeder 31 shown in FIG. 3 to an ion flame generator 30 comprised of a turbofan 26, a motor 27, an axial compressor (turbine) 28 driven by the motor 27 and an ion flame generating portion 29. The turbo-fan 26 serves to take-in air and to send the air to the turbine 28. As shown in FIG. 2, the turbo-fan 26 is provided with an air adjusting valve 32 so that an air intake amount is adjusted by adjusting an opening degree of the air adjusting valve 32 to control an air amount supplied to the turbine 28. In the turbine 28, movable vanes 34, a compression vane 35 and a distribution vane 36 are attached to a shaft 33 rotatingly driven by the motor 27. When the vanes 34, 35 are rotated inside fixed stationary vanes 37, the air sent from the turbo-fan 26 is compressed and injected toward the ion flame generating portion 29. The injected air is agitated by the distribution vane 36 to provide uniform pressure and then is sent into five fuel atomizers 38 of the ion flame generating portion 29.

Figure 4:
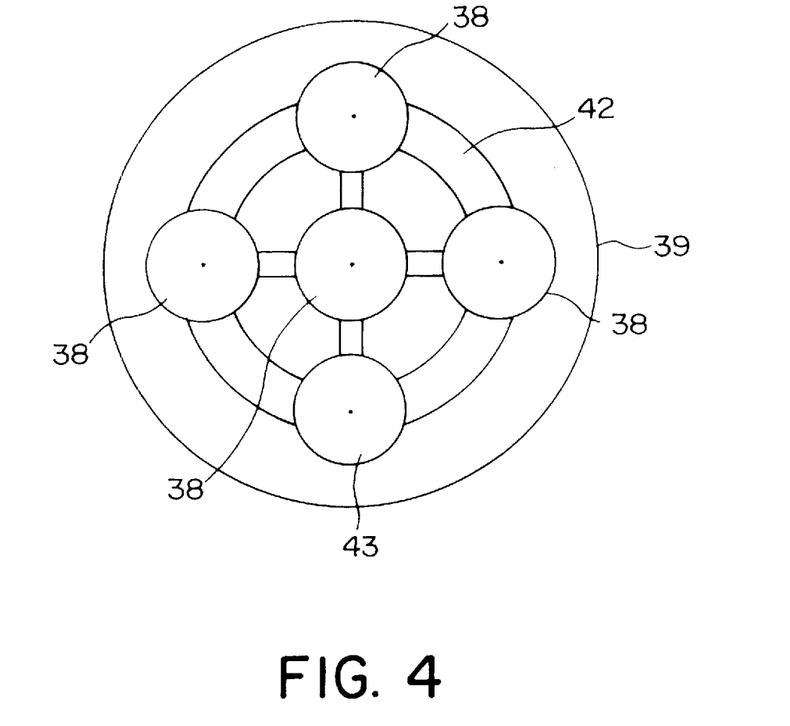
FIG. 4 is an explanatory view showing an installation condition of a fuel atomizer in the ion flame generator.

As shown in FIG. 2, in the ion flame generating portion 29, a cylindrical body 39 is formed from ferromagnetic metal (such as iron, nickel or cobalt) and the five fuel atomizers 38 are arranged inside the cylindrical body 39 as shown in FIG. 4, and a substantially cylindrical flame contact ionizing material 40 (FIG. 2) is disposed in front of the fuel atomizers 38. An electromagnetic coil 41 having an iron core is attached around the cylindrical body 39. Incidentally, the fuel atomizers 38 are fixed inside the cylindrical body 39 by a metal plate 42 shown in FIG. 4.

Figure 5:
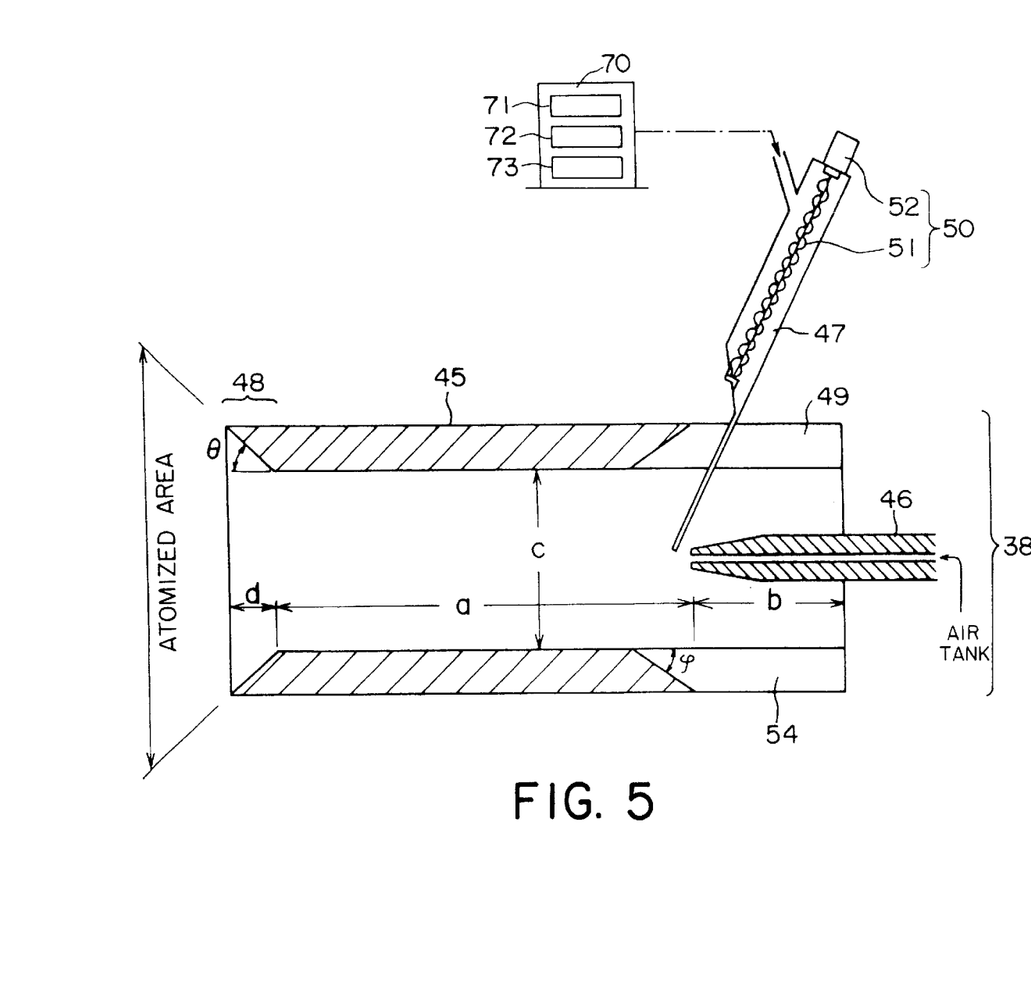
FIG. 5 is an explanatory view showing a structure of the fuel atomizer.

As shown in FIG. 5, in the fuel atomizer 38, a non-magnetic metal air injecting nozzle 46 (having nozzle diameter of 1 to 2 m $\phi$) for injecting high pressure (about 15 k pressure) air and a non-magnetic metal fuel dropping nozzle 47 for dropping fuel (kerosene, metal powder mixed oil or water) are inserted into and secured to the interior of a cylindrical body 45 made of non-magnetic metal (such as brass, stainless steel or the like) at a rear end portion thereof. As shown, an inner peripheral surface of a distal (front) end 48 of the cylindrical body 45 is flared or tapered outwardly to have a taper angle ($\theta$) of 40 to 60 degrees and taper length (d) of 10 to 15 mm. About fifteen to twenty slits 49 each having a width of 1.5 to 2 mm are formed in an outer peripheral surface of the rear end portion of the cylindrical body 45 in a circumferentially spaced relationship, and an angle ($\phi$) of a tip end of each slit 49 is selected to 45 degrees. The fuel dropping nozzle 47 is inserted into the cylindrical body 49 through one of the slits 49. An inner diameter (c) of the cylindrical body 45 is 35 to 45 mm, and a total length (a+b+d) is 170 to 215 mm. Incidentally, (a) is 160 to 200 mm and (b) is 50 to 60 mm. Further, the fuel dropping nozzle 47 is provided with an agitator 50 for agitating the fuel to be supplied. The agitator 50 serves to agitate the fuel by rotating a spiral rotary vane 51 by a motor 52.

In the fuel atomizer 38, the fuel dropped from the fuel dropping nozzle 47 is atomized into fine particles having diameter of $0.01\mu$ or less by high speed air sent from the rearward turbine 28 and high pressure air injected from the air injecting nozzle 46 and then is injected from the distal end portion 48. In the fuel atomizer 38, due to the presence of the taper of the distal end portion 48, once atomized fuel is injected smoothly without being liquidized again, thereby achieving high atomizing efficiency.

The flame contact ionizing material 40 is manufactured by crystalizing compound of mixture of photo-active substance and magnetic substance within an oxidizing environment. The photo-active substance may be monomer such as selenium, cadmium, titanium, lithium, barium or thallium, or compound such as oxide, sulfide or halide thereof, and the magnetic substance may be ferromagnetic substance (iron, nickel, cobalt or their compounds) or paramagnetic substance (manganese, aluminium, tin or their compounds) or diamagnetic substance (bismuth, phosphorus, copper, calcium or their compounds).

As shown in FIG. 2, the electromagnetic coil 41 is constituted by attaching copper wire coil 54 to an iron core 53, and a power supply (not shown) is connected to the copper wire coil 54. When pulse current is applied from the power supply to the electromagnetic coil 41, a strong high frequency magnetic field is generated inside the coil, thereby strongly magnetizing the cylindrical body 39 of the ion flame generating portion 29. The high frequency magnetic field has, for example, magnetic flux density of 10000 or more and frequency of about 20 to 50 MHz. The cylindrical body 39 magnetized by the electromagnetic coil 41 generates a high frequency magnetic field therein to activate the flame contact ionizing material 40, so that hydrocarbon flame contacted with the flame contact ionizing material 40 is changed to ion flame including numerous cations (carbon ions, hydrogen ions, iron ions or the like) and anions (oxygen ions). Incidentally, in the flame contact ionizing material 40 activated in the high frequency magnetic field, although the atomized fuel is fired only by contacting with the flame contact ionizing material, the flame contact ionizing material 40 is provided with a firing electrode 55 to enhance possibility of firing.

As shown in FIG. 3, in the ion breeder 31, a cylindrical body 60 is formed by alternately interconnecting non-magnetic metal (such as brass, stainless steel or the like) rings 61 and ferromagnetic metal (such as iron, nickel, cobalt or the like) rings 62, and electromagnetic coils 63 are attached around the ferromagnetic metal rings 62. There are three ferromagnetic metal rings 62 and three electromagnetic coils 63. Each electromagnetic coil 63 is constituted by winding an insulated copper wire 65 around the corresponding ferro-magnetic metal ring 62 with the interposition of an insulation paper 64 and winding cooling copper pipe 66 around the wire 65 with the interposition of an insulation paper 64 and winding a metal cover 67 around the pipe 66 with the interposition of an insulation paper 64. Incidentally, each electromagnetic coil 63 is firmly secured to an outer flange 68 of the cylindrical body 60 not to be shifted by a magnetic force generated or vibration of the ion burners 2.

The insulated copper wire 65 of each electromagnetic coil 63 is connected to a power supply (not shown) so that it can receive a great pulse current from the power supply. When the great pulse current is applied, the electromagnetic coil 63 generates a strong high frequency magnetic field inside the coil so as to magnetize the ferromagnetic metal ring 62 strongly in the high frequency magnetic field, with the result that the magnetized ferromagnetic metal ring 62 generates a strong high frequency magnetic field therewithin. The high frequency magnetic fields inside the ferromagnetic metal rings 62 vibrate ions in the ion flame generated by the ion flame generating portion 29 and accelerate the cations toward the flame injecting port and accelerate the anions toward the ion flame generating portion 29 and increase the number of cations and anions while elastically impinging the cations and anions against other particles (ionized particles and un-ionized particles). Further, by the presence of the ferromagnetic metal rings 62 and non-magnetic metal rings 61 alternately arranged, the ion flame is magnetically restricted steppingly to compress the ion flame (pinching effect), and the compressed cation flame is injected into the heating furnace 5. Incidentally, the anion flame is injected toward the ion flame generating portion 29.

The cooling copper pipe 66 of each electromagnetic coil 63 is connected to a cooling device (not shown) so that cooling water can be flown through the cooling copper pipe 66 to cool the electromagnetic coil 63. Although the electromagnetic coil 63 is heated to high temperature by heat from the insulated copper wire 65 (through which great current is flowing) and heat from the interior ion flame, the over-heat of the coil is prevented by the cooling water. The electromagnetic coil 63 may be cooled by water, other cooling media, or a forcibly cooling system.

In the ion flame generator 30 as mentioned above, while an example that the ion breeder 31 utilizes the high frequency magnetic fields generated by the multi-stage electromagnetic coils 64 was explained, a strong electrical field capable of vibrating and accelerating the ions may be generated inside the cylindrical body 60 of the ion breeder 31.

The fuel dropping nozzle 47 (FIG. 5) of the ion flame generator 30 can receive fuel from a fuel supplying device 70 through a pipe. The fuel supplying device 70 comprises a kerosene supplying device 71 for supplying kerosene, a water supplying device 72 for supplying water and a metal fuel supplying device 73 for supplying metal powder mixed oil. Among them, the kerosene supplying device 71 is a tank for storing the kerosene and the water supplying device 72 is a tank for storing the water.

Figure 6:
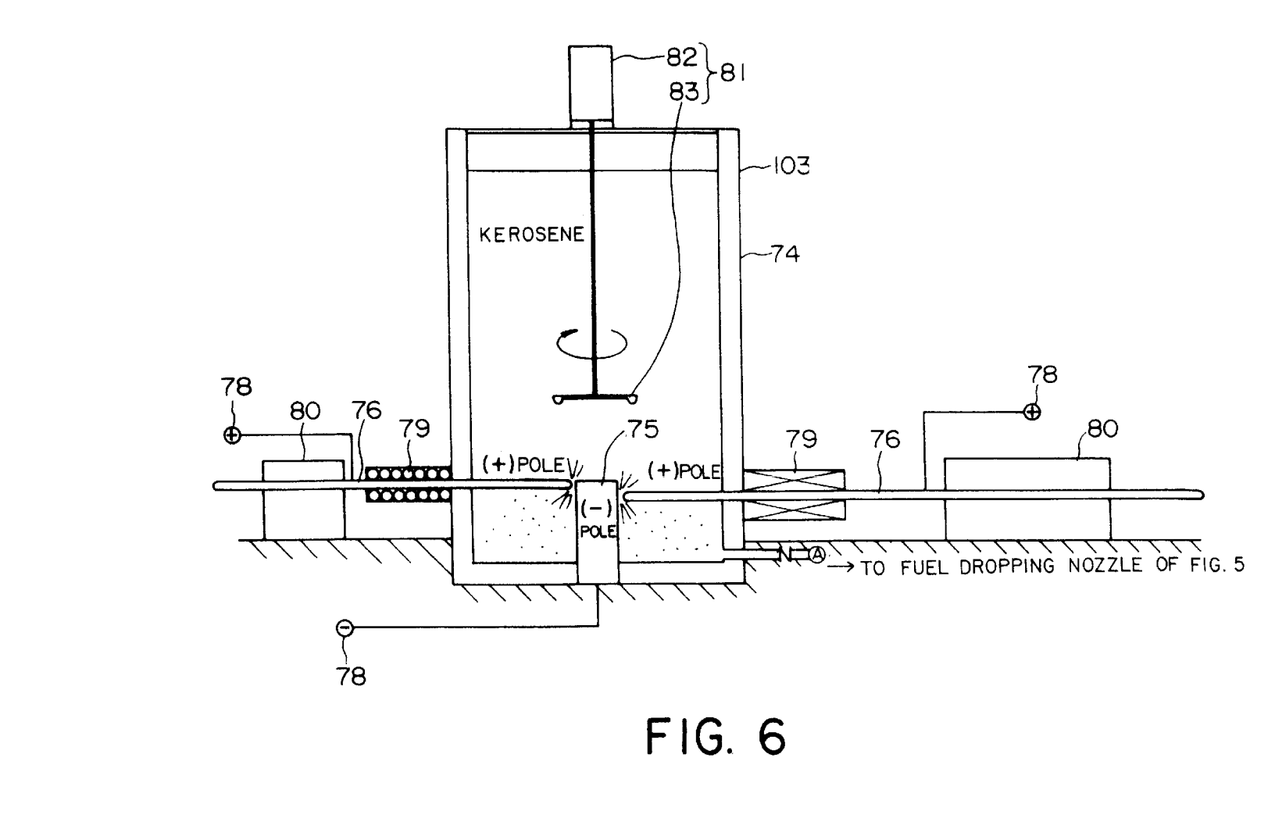
FIG. 6 is an explanatory view showing a metal fuel supplying device.

As shown in FIG. 6, in the metal fuel supplying device 73 (FIG. 5), a cylindrical minus electrode 75 made of conductive metal is vertically secured to the center of a bottom of a kerosene tank 74 made of insulation material, and a plus electrode rod 76 formed from an elongated cylindrical iron rod and a plus electrode rod 76 formed from an elongated cylindrical aluminium rod are disposed in the vicinity of the minus electrode 75, and the electrodes 75, 76 are connected to a high voltage power supply 78, so that high voltage (for example, 30000 to 100000 V) can be applied between the electrodes 75 and 76. In the metal fuel supplying device 73, by applying the voltage between the minus electrode 75 and the plus electrode rod 76 formed from iron or aluminium, when discharge is generated between the electrodes 75 and 76, fine particle (smaller than 0.5 mm) iron powder or aluminium powder is stripped from the surface of the plus electrode rod 76 and is discharged into the kerosene. In this case, carbon of hydrocarbon is deposited in the kerosene, the iron or aluminium powder is adhered to the deposited carbon to mix the metal powder with the kerosene, thereby forming the metal powder mixed oil. If necessary, surfactant may be added to the metal powder mixed oil. In such a case, the metal powder mixed oil can be stored for a relatively long term. However, the surfactant used must not prevent burning.

The two plus electrode rods 76 are horizontally inserted into the tank 74 through insertion holes formed in both side walls of the tank 74. Pieces of packing 79 are provided in the insertion holes to detachably hold the inserted plus electrode rods 76 and to prevent leakage of liquid. An insertion length (into the tank 74) of each plus electrode rod 76 can be adjusted by an automatic feed-in mechanism (electrode moving device) 80 so that a distance between a distal end of the plus electrode rod 76 and a distal end of the minus electrode 75 can be adjusted to facilitate occurrence of the discharging. When the distal end of the plus electrode rod 76 is shortened, the automatic feed-in mechanism 80 serves to automatically feed out the plus electrode rod 76 toward the minus electrode 75 accordingly, thereby always keeping the distance between the distal ends of the electrodes 75 and 76 constant. Incidentally, control of the feed-in amount of the plus electrode rod 76 effected by the automatic feed-in mechanism 80 can be realized, for example, by measuring the distance between the electrodes 75 and 76 by an optical sensor from exterior of the tank 74, or by monitoring potential or electrical current between the electrodes to generate the proper discharging, or by previously seeking the shortened rate of the electrode due to the discharging as an decreasing amount per unit time.

So long as the effective discharging can be achieved between the electrodes 75 and 76, the minus electrode 75 and the plus electrode rods 76 are not limited to the above-mentioned example, but, for example, one or both of the electrodes 75, 76 may be formed as a prismatic member. Further, the voltage or electrical current applied between the electrodes 75 and 76 can be appropriately set in accordance with shapes of the minus and plus electrodes 75, 76 and/or the distance between the electrodes and/or materials of the electrodes.

The tank 74 is provided with a fuel amount monitoring device (not shown) for measuring an amount of fuel within the tank so as to prevent the minus electrode 75 and the plus electrode rods 76 in the tank 74 from protruding upwardly from the liquid level. If the fuel is decreased below a predetermined amount, for example, the fuel amount monitoring device serves to replenish the fuel or to inform the operator of such fact. Due to the presence of the fuel amount monitoring device, the discharging can be prevented from occurring in the condition that the electrodes are protruded from the liquid level, thereby preventing the kerosene as the fuel from being fired, and, thus, preventing fire and explosion of the tank 74.

An agitating device 81 is disposed on the top of the tank 74. The agitating device 81 comprises a motor 82, and a propeller 83 rotatingly driven by the motor 82 and serves to agitate the kerosene in the tank 74 by the propeller 83. The number of revolutions of the propeller 83 can be appropriately set.

The kerosene supplying device 71 shown in FIG. 5 may be provided with a cracking device. The cracking device serves to decompose heavy petroleum having high boiling point to manufacture light petroleum having low boiling point (gasoline and the like). For example, the cracking device may be of the contact decomposing type using silica/alumina catalyst or, the thermal decomposing type for effecting decomposition at a high temperature (800 to 850° C.) without catalyst, or the hydrogenation decomposing type for effecting decomposition using catalyst in which nickel or tungsten is carried by silica/alumina and utilizing high pressure hydrogen. The cracking device is effective particularly when fuel having high boiling point such as heavy fuel oil is used in place of kerosene.

One of the fuels or combination thereof required can be supplied from the supplying devices 71, 72, 73 to the fuel dropping nozzle 47 through fuel switches. For example, only the kerosene can be supplied until the temperature reaches about 1800° C. after the ion flame generating device 30 was started, and, then, the metal powder mixed oil can be supplied until the temperature reaches about 2500° C., and thereafter, the metal powder mixed oil and water can be supplied. In this way, proper fuel can be selected and supplied in accordance with the burning temperature.

As shown in FIG. 1, above the ion burners 2, the discharge electrodes 3 are opposed to each other on the peripheral wall of the heating furnace 5. The discharge electrodes 3 are connected to power supplies (not shown) so that the temperature of the interior of the heating furnace 5 heated by the ion burners 2 can be maintained by generating the discharging between the electrodes by applying voltage to the electrodes.

Further, four particle accelerators 4 are provided on the peripheral wall of the heating furnace 5. The particle accelerators 4 serve to maintain the ion concentration inside the heating furnace 5 or to increase ions thereby to increase the ion concentration. A betatron, a cyclotron or a synchrotron may be used as the particle accelerator 4. In the betatron, electrons housed in a donut-shaped vacuum vessel are accelerated by externally applying an alternate magnetic field, so that the ion concentration inside the heating furnace 5 can be increased by discharging the accelerated electrons into the heating furnace 5. In the cyclotron, charged particles are repeatedly accelerated by a high frequency electrical field having cyclotron vibration number in synchronous with a circular movement having a predetermined period effected by a Lorentz force in a DC magnetic field, thereby obtaining high energy particles, and the ion concentration inside the heating furnace 5 is increased by discharging such high energy particles into the heating furnace 5. The synchrotron is an accelerator in which upper limit of energy of the said cyclotron is exceeded and in which electromagnets are arranged along a circular path having a predetermined radius to increase magnetic flux density as the particle speed is increased.

The gas inlet port 9 of the cylinder 1 is provided with a damper, so that, when the temperature and the ion concentration inside the heating furnace 5 exceeds a predetermined level (for example, temperature of 1800° C. to 3500° C.; ion concentration of 30% to 80%), the gas (atmospheric air) can be introduced into the cylinder 1 by opening the damper. Further, the amount of the introduced gas can be adjusted by changing the opening amount of the damper. In addition, a lower end of the gas inlet port 9 is protruded downwardly from the damper so that, when the damper is opened, the atmospheric air can smoothly flow into the cylinder 1. Incidentally, a metallic net is attached to the lower end of the air inlet port 9 to prevent foreign matters from entering into the cylinder 1.

As shown in FIG. 1, the axial fans 10, 12, 13 have a plurality of movable vanes 90 attached to the respective rotary shafts 14, 15, 16 along their longitudinal directions so that, when the vortical ascending current flowing upwardly through the cylinder 1 strike against the movable vanes 90, the rotary shafts 14, 15, 16 are rotated by energy of the air stream. The rotary shafts 14, 15, 16 of the axial fans 10, 12, 13 are connected to the rotary shafts 20, 21, 22 of the power generators of high voltage type (10000 V to 20000 V) via gears so that, when the axial fans 10, 12, 13 are rotated, the power generators 17, 18, 19 are driven for the power generation. In FIG. 1, six (in total) power generators can be driven by driving two power generators by each of the axial fans. Among three axial fans 10, 12, 13, the middle-stage axial fan 12 has fewer movable vanes 90 than those of the other axial fans 10, 13. The reason is that the adequate rotational force can be obtained even when the number of movable vanes 90 is small because the vortical ascending current is stabilized in the central portion of the cylinder 1. The axial fans are designed to endure against the vortical ascending current having current speed of 150 m/s.

As shown in FIG. 1, inside the cylinder 1, there are provided stationary vanes 91 around the axial fans 10, 12, 13 so that the movable vanes 90 of the axial fans 10, 12, 13 can be rotated inside the stationary vanes 91. With this arrangement, the vortical ascending current impinges the movable vanes 90 uniformly, thereby rotating the axial fans 10, 12, 13 efficiently.

As shown in FIG. 1, above the upper-stage axial fan 13, the vortical ascending current is discharged out of the cylinder 1 through the gas outlet port 11. An upper end of the gas outlet port 11 is protruded upwardly from the frame 6 so that the gas can smoothly be discharged. Further, auxiliary ion burners 2 (having calorific value of about $120 \times 10^4$ KC) are provided in the vicinity of the gas outlet port 11 so that the gas ascending through the cylinder 1 can be re-heated to promote the discharging of the gas. The structures of the auxiliary ion burners 2 are the same as those of the ion burners 2 provided on the heating furnace 5.

(Example of Usage)

For example, the power is generated by using the power generating system according to the present invention shown in FIG. 1 in the following manner.

1. In a condition that the damper of the gas inlet port 9 is closed, the ion burners 2 are operated to heat and ionize the air inside the heating furnace 5. Since the air heated inside the heating furnace 5 and having increased ion concentration is ascending through the cylinder 1 and is discharged outwardly through the gas outlet port 11, the high temperature is established inside the cylinder 1, and, thus, the air pressure inside the cylinder becomes lower than the atmospheric pressure.
2. When the temperature and the ion concentration inside the heating furnace 5 reach the predetermined levels (for example, temperature of 1600° C., ion concentration of 30%), the damper of the gas inlet port 9 is opened. Since the pressure inside the cylinder 1 is lower than the atmospheric pressure, when the damper is opened, the atmospheric air is flowing into the cylinder 1 through the gas inlet port 9 to equilibrate the pressure. In this case, since the lower temperature air has the tendency to flow into the higher temperature air from therearound, the atmospheric air having lower temperature than that of the air inside the cylinder 1 flows into the cylinder 1 through the gas inlet port while forming the vortical current and impinges against the lower-stage axial fan 10 to rotate the axial fan 10. When the lower-stage axial fan 10 is rotated, two power generators 17 connected thereto are driven for the power generation.
3. The gas passed through the lower-stage axial fan 10 flows into the heating furnace 5 while increasing the vortex speed by means of the rotation of the axial fan 10. In the heating furnace 5, the gas is instantaneously heated to create the vortical ascending current which is in turn ascending through the cylinder 1. The flow speed of the vortical ascending current is proportional to the temperature and the ion concentration of the heating furnace 5.
4. Then, the vortical ascending current impinges against the middle-stage axial fan 12 to rotate the axial fan 12. Further, the current impinges against the upper-stage axial fan 13 to rotate the axial fan 13. When two axial fans 12, 13 are rotated, the power generators 18, 19 connected thereto are driven for the power generation.
5. The vortical ascending current passed through the middle-stage and upper-stage axial fans 12, 13 is re-heated by the auxiliary ion burners 2 in front of the gas outlet port 11 and then is discharged out of the cylinder through the gas outlet port 11. Since the atmospheric air (neutral) flows into the air (ionized) in the discharged vortical ascending current, the air is neutralized to achieve neutralization.
6. In this way, the lower-stage, middle-stage and upper-stage axial fans are rotated to drive the power generators connected thereto, thereby realizing the power generation. The obtained electricity can be sent or used, if necessary with voltage reduction.

The ion burners 2 are temporarily stopped when the temperature and the ion concentration inside the heating furnace 5 reach the predetermined levels, and, thereafter, the temperature inside the heating furnace 5 is maintained by the discharging effected of the discharge electrodes 3, and the ion concentration in the heating furnace 5 is maintained by the particle accelerators 4. If the temperature and the ion concentration in the heating furnace 5 are decreased below the predetermined levels, the ion burners 2 are re-operated. When the ion burners 2 are operated intermittently in this way, the fuel required for the ion burners 2 can be saved and an amount of generated carbon dioxide can be reduced.

(Other Embodiments)

Figure 7:
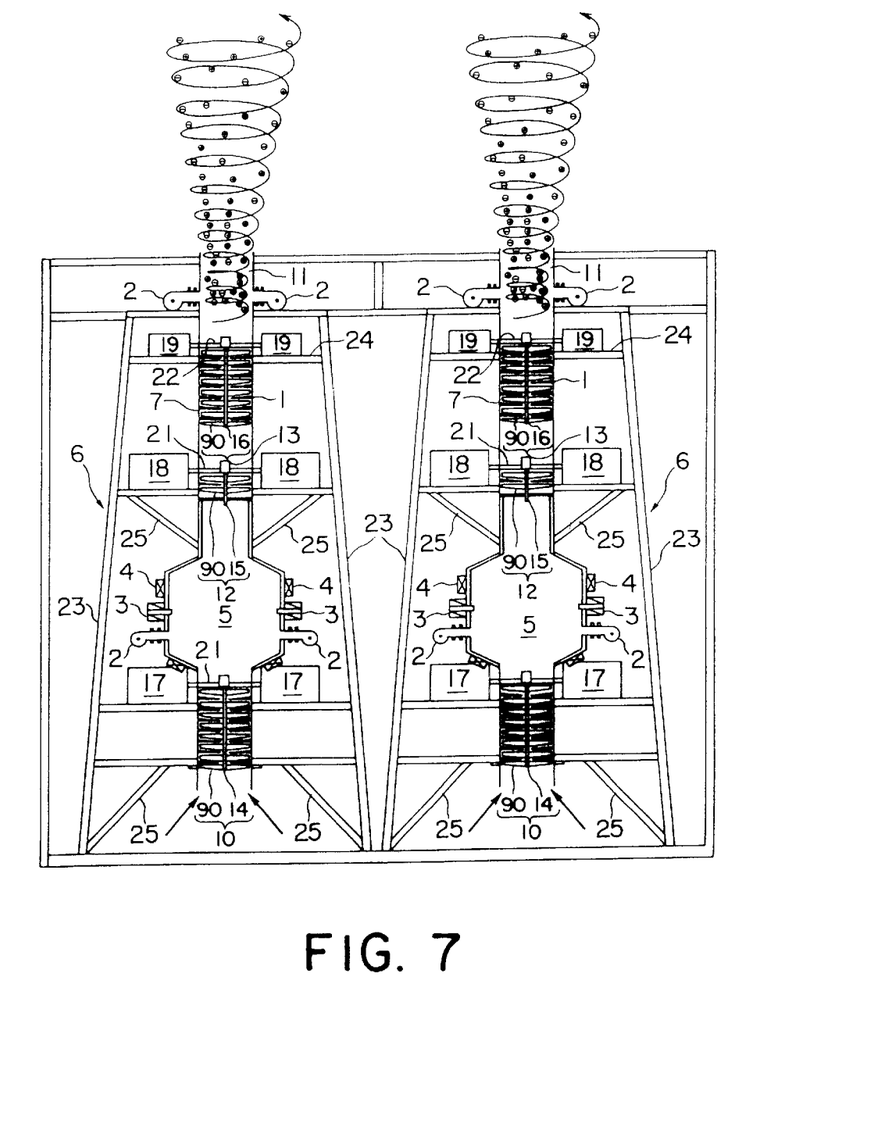
FIG. 7 is a schematic view showing an example of application of the power generating system of the present invention.

In the above-mentioned example of usage, while an example that only one power generating system according to the present invention is used was explained, as shown in FIG. 7, two or more power generating systems according to the present invention can be used together. Further, the number of the ion burners provided on the heating furnace is not limited to three, but smaller or larger number of ion burners may be used. The number of the axial fans disposed in the path and of the power generators are also not limited to the above-mentioned ones, but smaller or larger numbers of axial fans and power generators may be used. Further, power generators other than the high voltage type may be used. The numerical values regarding height of the frame, dimension of the struts and length and diameter of the cylinder and others shown in the above embodiment are merely exemplary.

Industrial Availability

1. The power generating system according to the present invention can achieve adequate power generation with extremely fewer fuel in comparison with the heat power generating systems. Further, the amount of generated carbon dioxide is small.
2. There is no danger of leaking detrimental substances such as radioactivity, unlike to the nuclear power generating systems. Further, it is easy to treat the used fuel.
3. It is not required for fabricate the dam, unlike to the hydraulic power generating systems.
4. The construction is simple, and installation cost is cheap.
5. Generally, adequate power generation can be achieved with simple construction and low cost without affecting a bad influence upon the environment, in comparison with the conventional various power generating systems.

What is claimed is:

1. A power generating system comprising:
    a cylindrical path having a height of several hundred meters, said cylindrical path comprising:
        a gas inlet port formed in a lower part of said cylindrical path; and
        a gas outlet port formed in an upper part of said cylindrical path;
    a damper configured to open and close said gas inlet port;
    a heating furnace which has a peripheral wall formed of castable refractories and is positioned in said cylindrical path;
    an axial fan having at least two rotor vanes in its axial direction and provided in said cylindrical path at a position above said heating furnace;
    a power generator that is provided outside of said cylindrical path and that is configured to operate in association with said axial fan; and
    an ion burner and a discharge electrode which are provided to said heating furnace and are configured to increase a temperature and ion concentration inside said heating furnace,
    wherein said ion burner comprises a fuel atomizer configured to atomize fuel which includes kerosene, metal powder mixed oil, and water and which is supplied from a fuel supplying device, said fuel supplying device comprises a metal fuel supplying device which is provided with a plus electrode and a minus electrode, when electric discharge is generated between said plus and minus electrodes, particulate metal powder formed from one of said plus and minus electrodes is discharged into the kerosene to cause a deposition of carbon of hydrocarbon in the kerosene, and the metal powder is adhered onto the deposited carbon so that metal powder mixed oil is produced;

the temperature and ion concentration inside said heating furnace are increased to predetermined levels by said ion burner such that gas supplied to said cylindrical path from said gas inlet port is ascended along said cylindrical path as a vortical ascending current, said axial fan is rotated by the vortical ascending current, and said power generator is driven by a rotation of said fan to generate power; and said ion burner and said discharge electrode are configured to increase and maintain the temperature and the ion concentration inside said heating furnace to levels suitable for generating the vortical ascending current.

2. A power generating system comprising:

a cylindrical path having a height of several hundred meters, said cylindrical path comprising:
   a gas inlet port formed in a lower part of said cylindrical path; and
   a gas outlet port formed in an upper part of said cylindrical path;

a damper capable of opening or closing said gas inlet port;

a heating furnace which has a peripheral wall formed of castable refractories and is positioned in said cylindrical path;

an axial fan having at least two rotor vanes in its axial direction and provided in said cylindrical path at a position above said heating furnace;

a power generator that is provided outside of said cylindrical path and that is configured to operate in association with said axial fan;

an ion burner provided to said heating furnace and configured to increase a temperature and ion concentration inside said heating furnace; and a particle accelerator provided to said heating furnace and configured to maintain the ion concentration inside said heating furnace or to increase ions to increase the ion concentration, wherein said ion burner comprises a fuel atomizer configured to atomize fuel which includes kerosene, metal powder mixed oil, and water and which is supplied from a fuel supplying device, said fuel supplying device comprises a metal fuel supplying device which is provided with a plus electrode and a minus electrode, when electric discharge is generated between said plus and minus electrodes, particulate metal powder formed from one of said plus and minus electrodes is discharged into the kerosene to cause a deposition of carbon of hydrocarbon in the kerosene, and the metal powder is adhered onto the deposited carbon so that metal powder mixed oil is produced;

the temperature and ion concentration inside said heating furnace are increased to predetermined levels by said ion burner such that gas supplied to said cylindrical path from said gas inlet port is ascended along said cylindrical path as a vortical ascending current, said axial fan is rotated by the vortical ascending current, and said power generator is driven by a rotation of said fan to generate power; and said ion burner and said particle accelerator are configured to maintain the ion concentration inside said heating furnace or to increase the ion concentration by increasing ions, the temperature and the ion concentration inside said heating furnace are controlled to generate the vortical ascending current.

3. A power generating system comprising:

a cylindrical path having a height of several hundred meters, said cylindrical path comprising:
   a gas inlet port formed in a lower part of said cylindrical path; and
   a gas outlet port formed in an upper part of said cylindrical path;

a damper configured to open and close said gas inlet port;

a heating furnace which has a peripheral wall formed of castable refractories and is positioned in said cylindrical path;

an ion burner and a discharge electrode which are provided to said heating furnace and configured to increase a temperature and ion concentration inside said heating furnace;

a particle accelerator provided to said heating furnace and configured to maintain the ion concentration inside said heating furnace and to increase the ion concentration by increasing ions;

an axial fan having at least two rotor vanes in its axial direction and provided in said cylindrical path above said heating furnace; and a power generator provided outside of said cylindrical path and configured to operate in association with said axial fan, wherein said ion burner comprises a fuel atomizer configured to atomize fuel which includes kerosene, metal powder mixed oil, and water and which is supplied from a fuel supplying device, said fuel supplying device comprises a metal fuel supplying device which is provided with a plus electrode and a minus electrode, when electric discharge is generated between said plus and minus electrodes, particulate metal powder formed from one of said plus and minus electrodes is discharged into the kerosene to cause a deposition of carbon of hydrocarbon in the kerosene, and the metal powder is adhered onto the deposited carbon so that metal powder mixed oil is produced;

the temperature and ion concentration inside said heating furnace are increased to predetermined levels by said ion burner such that gas supplied to said cylindrical path from said gas inlet port is ascended along said cylindrical path as a vortical ascending current, said axial fan is rotated by the vortical ascending current, and said power generator is driven by a rotation of said fan to generate power; and said ion burner and said discharge electrode are configured to increase and maintain the temperature and the ion concentration inside said heating furnace to levels suitable for generating the vortical ascending current or said ion burner and said particle accelerator are configured to maintain the ion concentration inside said heating furnace or to increase the ion concentration by increasing ions.

4. A power generating system comprising:
a cylindrical path having a height of several hundred meters, said cylindrical path comprising:
  a gas inlet port formed in a lower part of said cylindrical path; and
  a gas outlet port formed in an upper part of said cylindrical path;
a damper configured to open and close said gas inlet port;
a heating furnace which has a peripheral wall formed of castable refractories and is positioned in said cylindrical path;
an ion burner and a discharge electrode which are provided to said heating furnace and configured to increase a temperature and ion concentration inside said heating furnace;
a particle accelerator provided to said heating furnace and configured to maintain the ion concentration inside said heating furnace and to increase the ion concentration by increasing ions;
an axial fan having at least two rotor vanes in its axial direction and provided in said cylindrical path above said heating furnace; and
a power generator provided outside of said cylindrical path and configured to operate in association with said axial fan,
wherein said ion burner includes an ion frame generator and an ion breeding unit provided to the ion frame generator,
said ion frame generator comprises a fuel atomizer configured to atomize fuel which includes kerosene, metal powder mixed oil, and water and which is supplied from a fuel supplying device,
said fuel supplying device comprises a metal fuel supplying device which is provided with a plus electrode and a minus electrode in a kerosene tank,
when electric discharge is generated between said plus and minus electrodes, particulate metal powder formed from the plus electrode is discharged into the kerosene to cause a deposition of carbon of hydrocarbon in the kerosene, and the metal powder is adhered onto the deposited carbon so that the metal powder mixed oil is produced;
when said plus electrode becomes shorter due to the discharge of said metal powder, said plus electrode is automatically fed out into the kerosene tank with an automatic feed-in apparatus;
said ion breeding vibrates ions in the ion flame generated by the ion breeding unit, and accelerates cations and anions to increase numbers of cations and anions,
the temperature and ion concentration inside said heating furnace are increased to predetermined levels by said ion burner such that gas supplied to said cylindrical path from said gas inlet port is ascended along said cylindrical path as a vortical ascending current, said axial fan is rotated by the vortical ascending current, and said power generator is driven by a rotation of said fan to generate power; and
said ion burner and said discharge electrode are configured to increase and maintain the temperature and the ion concentration inside said heating furnace to levels suitable for generating the vortical ascending current or said ion burner and said particle accelerator are configured to maintain the ion concentration inside said heating furnace or to increase the ion concentration by increasing ions.

5. A power generating system according to claim 1, wherein two or more axial fans are provided in said cylindrical path, and two or more power generators configured to operate in association with said axial fans are provided outside of said cylindrical path, each of said axial fans being designed such that the rotor vanes thereof are rotated within stationary vanes provided in said cylindrical path.

6. A power generating system according to claim 2, wherein two or more axial fans are provided in said cylindrical path, and two or more power generators configured to operate in association with said axial fans are provided outside of said cylindrical path, each of said axial fans being designed such that the rotor vanes thereof are rotated within stationary vanes provided in said cylindrical path.

7. A power generating system according to claim 3, wherein two or more axial fans are provided in said cylindrical path, and two or more power generators configured to operate in association with said axial fans are provided outside of said cylindrical path, each of said axial fans being designed such that the rotor vanes thereof are rotated within stationary vanes provided in said cylindrical path.

8. A power generating system according to claim 4, wherein two or more axial fans are provided in said cylindrical path, and two or more power generators configured to operate in association with said axial fans are provided outside of said cylindrical path, each of said axial fans being designed such that the rotor vanes thereof are rotated within stationary vanes provided in said cylindrical path.

9. A power generating system according to claim 1, further comprising:
an auxiliary ion burner provided at an upper part of said cylindrical path and configured to re-heat the gas ascending through said cylindrical path to promote discharging of the vertical ascending current through said gas outlet port.

10. A power generating system according to claim 2, further comprising:
an auxiliary ion burner provided at an upper part of said cylindrical path and configured to re-heat the gas ascending through said cylindrical path to promote discharging of the vertical ascending current through said gas outlet port.

11. A power generating system according to claim 3, further comprising:
an auxiliary ion burner provided at an upper part of said cylindrical path and configured to re-heat the gas ascending through said cylindrical path to promote discharging of the vertical ascending current through said gas outlet port.

12. A power generating system according to claim 4, further comprising:
an auxiliary ion burner provided at an upper part of said cylindrical path and configured to re-heat the gas ascending through said cylindrical path to promote discharging of the vertical ascending current through said gas outlet port.

13. A power generating system according to claim wherein;
the temperature and ion concentration inside said heating furnace are increased up to predetermined levels by said ion burner such that the gas supplied to said cylindrical path from said gas inlet ascends in said cylindrical path as a vortical ascending current, said axial fan is configured to be rotated by the vortical ascending current, and said power generator is configured to be driven by a rotation of said fan to generate power; and when the temperature and the ion concentration inside said heating furnace has reached the predetermined levels by said ion burner, said ion burner is configured to be temporarily stopped, and thereafter said discharge electrode is configured to be driven to maintain the temperature or the ion concentration inside said heating furnace, and when the temperature or the ion concentration has decreased below the predetermined levels, said ion burner is configured to be driven again to increase the temperature and the ion concentration inside said heating furnace up to the predetermined levels, and thereafter, by repeating the process of the temporary stoppage of said ion burner, the driving of said discharge electrode and then the re-driving of said ion burner, the temperature and the ion concentration inside said heating furnace are maintained at levels suitable for generating the vortical ascending current.

14. A power generating system according to claim 3, wherein;

the temperature and ion concentration inside said heating furnace are increased up to predetermined levels by said ion burner such that the gas supplied to said cylindrical path from said gas inlet ascends in said cylindrical path as a vortical ascending current, said axial fan is configured to be rotated by the vortical ascending current, and said power generator is configured to be driven by a rotation of said fan to generate power; and when the temperature and the ion concentration inside said heating furnace has reached the predetermined levels by said ion burner, said ion burner is configured to be temporarily stopped, and thereafter said discharge electrode is configured to be driven to maintain the temperature or the ion concentration inside said heating furnace, and when the temperature or the ion concentration has decreased below the predetermined levels, said ion burner is configured to be driven again to increase the temperature and the ion concentration inside said heating furnace up to the predetermined levels, and thereafter, by repeating the process of the temporary stoppage of said ion burner, the driving of said discharge electrode and then the re-driving of said ion burner, the temperature and the ion concentration inside said heating furnace are maintained at levels suitable for generating the vortical ascending current.

15. A power generating system according to claim 4, wherein;

the temperature and ion concentration inside said heating furnace are increased up to predetermined levels by said ion burner such that the gas supplied to said cylindrical path from said gas inlet ascends in said cylindrical path as a vortical ascending current, said axial fan is configured to be rotated by the vortical ascending current, and said power generator is configured to be driven by a rotation of said fan to generate power; and when the temperature and the ion concentration inside said heating furnace has reached the predetermined levels by said ion burner, said ion burner is configured to be temporarily stopped, and thereafter said discharge electrode is configured to be driven to maintain the temperature or the ion concentration inside said heating furnace, and when the temperature or the ion concentration has decreased below the predetermined levels, said ion burner is configured to be driven again to increase the temperature and the ion concentration inside said heating furnace up to the predetermined levels, and thereafter, by repeating the process of the temporary stoppage of said ion burner, the driving of said discharge electrode and then the re-driving of said ion burner, the temperature and the ion concentration inside said heating furnace are maintained at levels suitable for generating the vortical ascending current.

16. A power generating system according to claim 12, wherein:

the temperature and ion concentration inside said heating furnace are increased up to predetermined levels by said ion burner such that the gas supplied to said cylindrical path from said gas inlet port ascends in said cylindrical path as a vortical ascending current, and said axial fan is configured to be rotated by the vortical ascending current, and said power generator is configured to be driven by a rotation of said fan for power generation; and when the temperature and the ion concentration inside said heating furnace has reached the predetermined levels by said ion burner, said ion burner is configured to be temporarily stopped, and thereafter said particle accelerator is configured to be driven to maintain or increase the temperature or the ion concentration inside said heating furnace, and when the temperature or the ion concentration has decreased below the predetermined levels, said ion burner is configured to be driven again to increase the temperature and the ion concentration inside said heating furnace up to the predetermined levels, and thereafter, by repeating the process of the temporary stoppage of said ion burner, the driving of said particle accelerator and then the re-driving of said ion burner, the temperature and the ion concentration inside said heating furnace are maintained at levels suitable for generating the vortical ascending current, when the temperature and the ion concentration inside said heating furnace has reached the predetermined levels by said ion burner, said ion burner is temporarily stopped, and thereafter said particle accelerator is driven to maintain or increase the temperature or the ion concentration inside said heating furnace, and if the temperature or the ion concentration has decreased below the predetermined level, said ion burner is driven again to increase the temperature and the ion concentration inside said heating furnace up to the predetermined levels, and thereafter, by repeating the process of the temporary stoppage of said ion burner, the driving of said particle accelerator and then the re-driving of said ion burner, the temperature and the ion concentration inside said heating furnace are maintained to levels suitable for generating the vortical ascending current.

17. A power generating system according to claim 3, wherein:

the temperature and ion concentration inside said heating furnace are increased up to predetermined levels by said ion burner such that the gas supplied to said cylindrical path from said gas inlet port ascends in said cylindrical path as a vortical ascending current, and said axial fan is configured to be rotated by the vortical ascending current, and said power generator is configured to be driven by a rotation of said fan for power generation; and when the temperature and the ion concentration inside said heating furnace has reached the predetermined levels by said ion burner, said ion burner is configured to be temporarily stopped, and thereafter said particle accelerator is configured to be driven to maintain or increase the temperature or the ion concentration inside said heating furnace, and when the temperature or the ion concentration has decreased below the predetermined levels, said ion burner is configured to be driven again to increase the temperature and the ion concentration inside said heating furnace up to the predetermined levels, and thereafter, by repeating the process of the temporary stoppage of said ion burner, the driving of said particle accelerator and then the re-driving of said ion burner, the temperature and the ion concentration inside said heating furnace are maintained at levels suitable for generating the vortical ascending current, when the temperature and the ion concentration inside said heating furnace has reached the predetermined levels by said ion burner, said ion burner is temporarily stopped, and thereafter said particle accelerator is driven to maintain or increase the temperature or the ion concentration inside said heating furnace, and if the temperature or the ion concentration has decreased below the predetermined level, said ion burner is driven again to increase the temperature and the ion concentration inside said heating furnace up to the predetermined levels, and thereafter, by repeating the process of the temporary stoppage of said ion burner, the driving of said particle accelerator and then the re-driving of said ion burner, the temperature and the ion concentration inside said heating furnace are maintained to levels suitable for generating the vortical ascending current.

18. A power generating system according to claim 4, wherein:

the temperature and ion concentration inside said heating furnace are increased up to predetermined levels by said ion burner such that the gas supplied to said cylindrical path from said gas inlet port ascends in said cylindrical path as a vortical ascending current, and said axial fan is configured to be rotated by the vortical ascending current, and said power generator is configured to be driven by a rotation of said fan for power generation; and when the temperature and the ion concentration inside said heating furnace has reached the predetermined levels by said ion burner, said ion burner is configured to be temporarily stopped, and thereafter said particle accelerator is configured to be driven to maintain or increase the temperature or the ion concentration inside said heating furnace, and when the temperature or the ion concentration has decreased below the predetermined levels, said ion burner is configured to be driven again to increase the temperature and the ion concentration inside said heating furnace up to the predetermined levels, and thereafter, by repeating the process of the temporary stoppage of said ion burner, the driving of said particle accelerator and then the re-driving of said ion burner, the temperature and the ion concentration inside said heating furnace are maintained at levels suitable for generating the vortical ascending current, when the temperature and the ion concentration inside said heating furnace has reached the predetermined levels by said ion burner, said ion burner is temporarily stopped, and thereafter said particle accelerator is driven to maintain or increase the temperature or the ion concentration inside said heating furnace, and if the temperature or the ion concentration has decreased below the predetermined level, said ion burner is driven again to increase the temperature and the ion concentration inside said heating furnace up to the predetermined levels, and thereafter, by repeating the process of the temporary stoppage of said ion burner, the driving of said particle accelerator and then the re-driving of said ion burner, the temperature and the ion concentration inside said heating furnace are maintained to levels suitable for generating the vortical ascending current.

* * * * *

UNITED STATES PATENT AND TRADEMARK OFFICE
CERTIFICATE OF CORRECTION

PATENT NO. : 6,484,502 B1
DATED : November 26, 2002
INVENTOR(S) : Masaichi Kikuchi It is certified that error appears in the above-identified patent and that said Letters Patent is hereby corrected as shown below:

Column 14,
Line 61, after "claim" please add -- 1, --.

Signed and Sealed this

Twenty-first Day of June, 2005

JON W. DUDAS
*Director of the United States Patent and Trademark Office*